United States Patent [19]

McKiel et al.

[11] Patent Number: 5,388,993

[45] Date of Patent: Feb. 14, 1995

[54] METHOD OF AND SYSTEM FOR DEMONSTRATING A COMPUTER PROGRAM

[75] Inventors: Frank A. McKiel; G. Michael Trowbridge, both of Trophy Club; Cathy J. Cavendish, Dallas; Robert J. Catino, Southlake, all of Tex.

[73] Assignee: International Business Machines Corporation, Armonk, N.Y.

[21] Appl. No.: 914,185

[22] Filed: Jul. 15, 1992

[51] Int. Cl.⁶ .............................................. G09B 19/00
[52] U.S. Cl. .............................. 434/118; 434/307 R; 434/365; 395/154; 395/927; 364/419.2; 345/156
[58] Field of Search ............... 434/118, 169, 185, 307, 434/308, 323, 362, 365, 307 R; 364/419, 419.2; 395/154, 152, 153, 927; 371/19, 24, 25.1, 26, 28.1, 67.1; 340/706, 709, 825.22; 345/163, 156

[56] References Cited

U.S. PATENT DOCUMENTS

| | | | |
|---|---|---|---|
| 3,707,725 | 12/1972 | Dellheim | 371/19 |
| 4,672,554 | 6/1987 | Ogaki | 364/479 |
| 4,696,003 | 3/1987 | Kerr et al. | 371/19 |
| 4,802,104 | 1/1989 | Ogiso | 395/153 |
| 4,827,404 | 5/1989 | Barstow et al. | 395/152 X |
| 5,038,316 | 8/1991 | Hempleman et al. | 364/419 X |
| 5,096,423 | 3/1992 | Goldwasser | 434/118 |
| 5,111,409 | 5/1992 | Gasper et al. | 434/185 X |
| 5,166,886 | 11/1992 | Molnar et al. | 364/479 |
| 5,169,342 | 12/1992 | Steele et al. | 434/118 X |
| 5,175,812 | 12/1992 | Krieger | 395/156 |
| 5,198,379 | 9/1992 | Konno et al. | 371/19 X |
| 5,210,859 | 5/1993 | Aoshima et al. | 371/19 X |

*Primary Examiner*—Richard J. Apley
*Assistant Examiner*—Joe H. Cheng
*Attorney, Agent, or Firm*—Jonathan E. Jobe; Andrew J. Dillon

[57] ABSTRACT

A system and method are provided for building a help function in the form of a tutorial that physically demonstrates to an end user the function that the end user wants to understand. The invention includes a script language that includes tags or commands that the information developer can use in demonstrating the application program and providing tutorial information to the user. The system includes an interpreter that interprets the script language.

15 Claims, 3 Drawing Sheets

METHOD OF AND SYSTEM FOR DEMONSTRATING A COMPUTER PROGRAM

BACKGROUND OF THE INVENTION

1. Field of the Invention

The present invention relates generally to methods of and systems for providing tutorial information about computer application programs to end users, and more particularly to a method of and system for providing tutorial information to an end user and physically demonstrating the application program by simulated operation of the application program itself.

2. Description of the Prior Art

Development of tutorials for and demonstrations of computer software applications is often a lengthy and difficult process involving the need for personnel with skills in technical writing, programming, and systems architecture, as well as product expertise. Presently, the building of tutorials and demonstrations must be started early in the development cycle of a new product. The technical writer must write textual material that describes the contemplated functions and operations of the product. At the same time, a skilled programmer must create a mock-up program that looks like the contemplated program and demonstrates its functions. The technical writers and the demonstration programmers must work closely together in order to coordinate their efforts. Moreover, the technical writers and demonstration programmers must work closely with the developers of the actual program product. As the design and implementation of the product changes over the course of development, the demonstrations and mock-ups and technical material may need to be changed in order to match the final version of the product. Considerable effort is required to synchronize the tutorial and actual product so that the resulting tutorial screens exactly resemble the program product.

SUMMARY OF THE INVENTION

In the present invention, a technique is provided for building a help function in the form of a tutorial that physically demonstrates to an end user the function or series of product functions that the end user wants to understand. The invention includes a script language that enables a nonprogrammer to create help text for a tutorial which in fact runs and controls the actual program. A demonstration program, which in the preferred embodiment includes an interpreter for interpreting the script language, and the application program to be demonstrated, are run simultaneously in a multitasking environment. The demonstration program provides textual, audio, or video information to the user and simulated user inputs to the application program, thereby to demonstrate the application program.

The script language includes tags or commands that the information developer can use in demonstrating the application program and providing tutorial information to the user. One group of tags is used to locate and manipulate any named window appearing on the computer system display screen. This allows the demonstration to be created independent of the product application. The script language also includes tags that simulate mouse and keyboard activity. These commands allow the information developer to demonstrate the actual product to the user by manipulating it directly, rather than by creating mock-ups of the product.

Finally, the script language includes commands or tags to provide special functions as needed by the information developer. These special functions include providing textual information to the user and prompting the user to start the demonstration. It is important to note that the invention removes the need for a programmer to create the tutorial. The skills required have been reduced to the level of a technical writer with little or no programming skills.

DESCRIPTION OF THE PREFERRED EMBODIMENT

Figure 1:
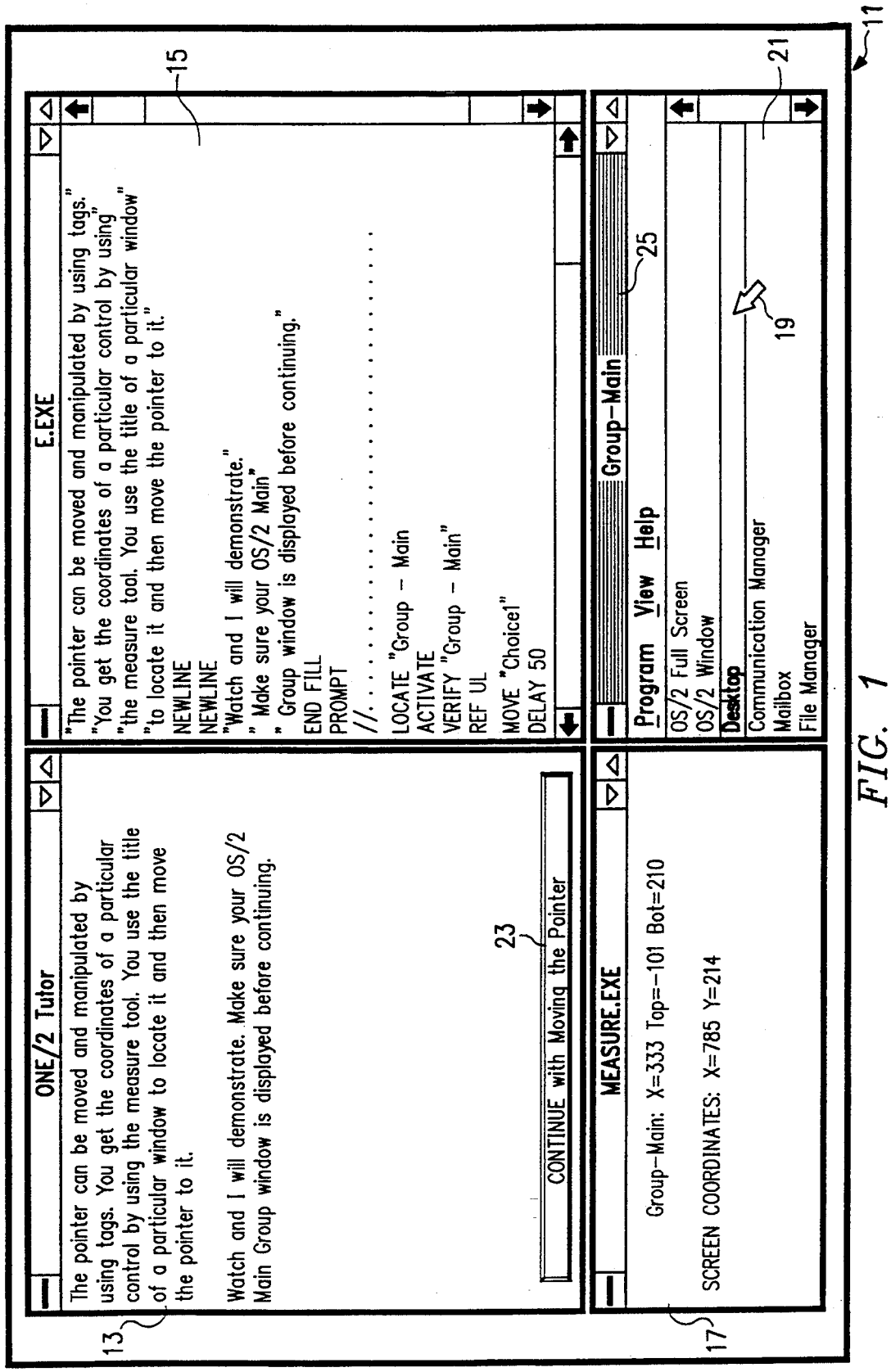
FIG. 1 is a pictorial representation of a computer display screen with various windows according to the present invention displayed therein.

Referring now to the drawings, and first to FIG. 1, a computer system display screen is designated generally by the numeral 11. In FIG. 1, four windows are displayed on display screen 11 that demonstrate various aspects of the present invention. One window, which is labeled "ONE/2 Tutor", is identified by the numeral 13. ONE/2 Tutor window 13 presents textual tutorial information to a user. In the example of FIG. 1, textual information about the present invention is presented.

Referring still to FIG. 1, a window labeled "E.EXE", which is designated by the numeral 15, is displayed on display screen 11. E.EXE window 15 contains the script for the example of the present invention displayed in FIG. 1. E.EXE window 15 does not need to be displayed to the user during the operation of the present invention; however, in an environment that supports the display of multiple application windows, such as the preferred OS/2 Presentation Manager* (Trademark of IBM Corp.) system, E.EXE window 15 can be displayed as illustrated in FIG. 1.

Also displayed on display screen 11 is a window labeled "MEASURE.EXE" and identified by the numeral 17. MEASURE.EXE window 17 displays a tool that is useful to the information developer in creating demonstrations and tutorials according to the present invention. MEASURE.EXE window 17 displays to the information developer the location of the graphical pointer 19 so that the developer can insert screen coordinates into the script for a demonstration, as will be explained in detail hereinafter. Also displayed in screen 11 of FIG. 1 is a window labeled "Group-Main", which is designated by the numeral 21. Group-Main window 21 displays a list of windows and programs that are available to a user, and it is part of the user interface of the program to be demonstrated in the example of FIG. 1. In FIG. 1, the "Desktop" item of the list of Group-Main window 21 is shown highlighted pursuant to its selection by pointer 19.

While the structure of the script language and operation of the present invention will be explained in detail hereinafter, a basic understanding of the invention can be obtained by inspection by FIG. 1. In the first four lines of the material in E.EXE window 15, there is displayed textual material within quotation marks.

E.EXE window 15 displays only a portion of the script for a demonstration. Above the first line displayed in E.EXE window 15 there is a tag or command FILL (not shown), which is used to fill ONE/2 Tutor window 13 with the text that follows within quotation marks using word wrapping in the turn text window until an ENDFILL is processed. Thus, the first four lines displayed in E.EXE window 15 are displayed in ONE/2 Tutor window 13.

Following the first four lines displayed in E.EXE window 15 there are two lines that contain the command NEWLINE. The NEWLINE command is used within a FILL statement for spacing of text. Thus, in ONE/2 Tutor window 13, the initial block of text is followed by two blank lines. After the second NEWLINE command in E.EXE window 15, there are three more lines of text in quotation marks, which are displayed in ONE/2 Tutor window 13. The final three lines of text in E.EXE window 15 are followed by an END FILL command, which signifies the end of a tutorial window text panel. The END FILL command is followed by a PROMPT command, which will cause execution of the script to pause until the user moves pointer 19 to the CONTINUE bar 23 of ONE/2 Tutor window 13 and clicks mouse button number 1. Clicking on CONTINUE bar 23 allows the user to resume execution of the script after the user has had time to read and absorb the textual material presented in ONE/2 Tutor window 13.

Upon resumption of the script, the system processes the next line of the script, which is displayed in E.EXE window 15, and which is LOCATE "Group-Main". The LOCATE "Window Name" command will locate the named window on the screen. Window manipulation commands that follow the LOCATE command will pertain to the located window until another LOCATE command is encountered. Following the LOCATE "Group-Main" command there is an ACTIVATE command, which will make the window that was most recently located the active window. Thus, in FIG. 1, Group-Main window 21 is activated as indicated by its dark title bar 25. As those skilled in the art will recognize, the active window of a display can receive keyboard or mouse input.

Referring again to E.EXE window 15, following the ACTIVATE command, there is the command VERIFY "Group-Main". The verify command causes the system to check to see if the named window was found. Since the system for which the tutorial is built is multitasking, it is possible that the end user may have decided to go to perform another task in the meantime, so the verify command is just a check to see that the window was found and that it is the active window. If the named window is not found, in the preferred embodiment, a dialog box will appear giving the user the option to continue or quit. Referring still to E.EXE window 15, following the VERIFY command there is the command REF UL, which is used to set the reference point for a located window the upper left hand corner. Following the REF UL command, the next line of the script of E.EXE window 15 is MOVE "Choice1". The MOVE command causes the system to issue a simulated mouse move command, which moves cursor 19 to a designated location, which may either be X,Y screen coordinates, or, as in Group-Main window 21, a previously-defined named location. Following the move "Choice1" command of the script of E.EXE window 15, there is the command DELAY 50, which causes the script to pause for the specified amount of time. Delays are necessary since the execution of the move mouse cursor command takes a finite time and it is necessary to wait for the action to be completed. In the preferred embodiment, the units for the delay are 100ths of seconds. Thus, in the example of FIG. 1, the system delays one half second before proceeding. The system continues in like fashion to read and execute the script, thereby to present textual information and demonstrate the program to the user.

Figure 2:
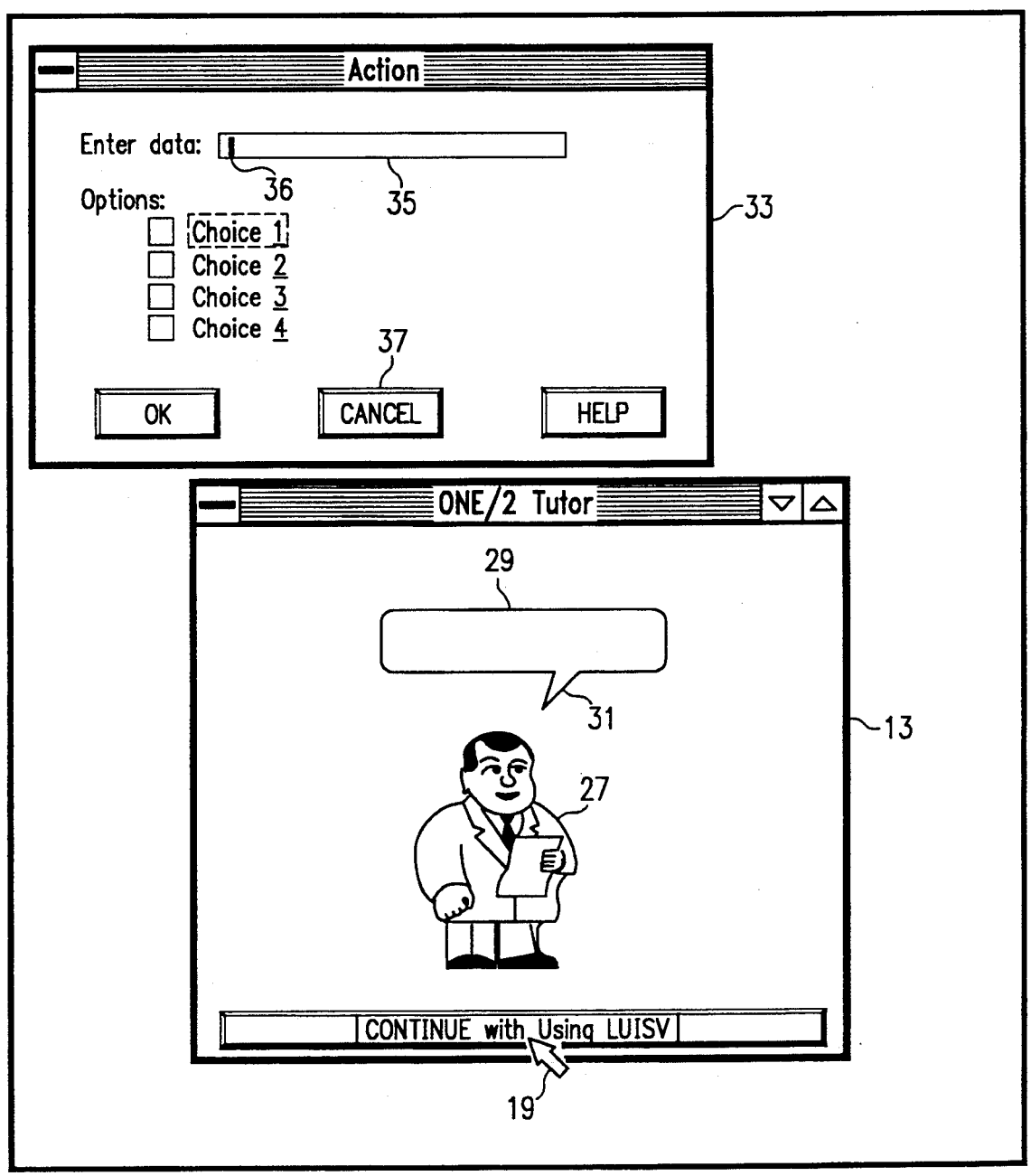
FIG. 2 is a pictorial representation of a computer display screen with additional windows according to the present invention displayed therein.

Referring now to FIG. 2, another aspect of the invention is shown displayed on screen 11. Rather than purely textual material displayed in ONE/2 Tutor window 13 as shown in FIG. 1, there is a figure of a person 27 and a speech bubble 29. The FIG. 27 and speech bubble 29 are displayed in ONE/2 Tutor window 13 in response to the script command TRAV "Text". The "Text" scrolls through speech bubble 29, thereby to provide tutorial information to the user. In the preferred embodiment of the invention, the user can control the speed at which text scrolls across speech bubble 29 by moving the descender 31 of speech bubble 29 toward the left or toward the right with pointer 19, which is operated by a mouse (not shown). In the preferred embodiment, human FIG. 29 may be provided with animation, such as eye movement, or with an audio track so he actually talks to make the presentation more interesting to the user.

Also shown in screen 11 of FIG. 2 is a window 33 that is labeled "Action". As will be explained in detail with respect to the various commands of the script language of the present invention, the invention can be used to demonstrate user interaction with all elements of a graphical interface. For example, the system can simulate the typing of text into entry field 35 of action window 33 at typing cursor 36. Similarly, simulated mouse inputs can be generated to operate buttons or check boxes, such as cancel button 37.

Tutorial window 13 may also be used to display video to the user and thereby create interesting multimedia presentations. For example, a "live" teacher on video can present the tutorial information to the user or demonstrate certain operations to the user.

The script language of the present invention includes commands that can readily locate and manipulate any named window appearing on the screen. These commands allow the information developer to create the tutorial independent of the product application. The commands that relate to window manipulation and their descriptions are listed below:

LOCATE "Window Name"—This command will locate the given window on the screen. Window manipulation commands that follow a LOCATE will pertain the located window until another LOCATE is issued.

ACTIVATE—This command will make the window that was most recently located the active window.

POSITION "x,y"—This command will position the lower left hand corner of a previously located window at the specified X,Y coordinates.

REF UL—This command is used to set the reference point for a located window to the upper left hand corner. Window coordinates used will then be relative to the upper left hand corner, rather than the default value of the lower left hand corner.

SHOW—This command will cause a window that has been repositioned or resized to be redisplayed.

SIZE "x,y"—This command is used to resize a window, where X is equal to width and Y is equal to height.

TOP—This command will bring the located window to the top whenever the located window is hidden behind other windows on the screen.

VERIFY—this command will check to see if the window that was used in the locate command was found. If not, a dialog box will appear giving the user the option to continue or quit. It is used in the case where the end user may have closed a window that is required in the tutorial.

The script language also includes commands that will simulate mouse and keyboard activity. These commands allow the information developer to demonstrate the actual product to the user by manipulating it directly. The mouse and keyboard activity is "simulated" in the sense that mouse inputs, pointer movement and keystroke inputs are not produced by actual manipulation of the mouse or keyboard. Rather, in the present invention, mouse and keyboard messages are sent to the system, which the application program understands to be real messages. These commands are as follows:

BACK—This command causes a simulated backspace command to be issued at the current typing cursor position.

BUTTON1DOWN—This command is used to send a mouse button1down command to the system.

BUTTON1UP—This command is used to send a button1up message to the system and it is used following a button1down.

BUTTON2DOWN—This command is used to send a mouse button2down message to the system.

BUTTON2UP—This command is used to send a button2up message to the system and it is issued following a button2down command.

BUTTON1CL—This command is used to send a button2click message to the system.

BUTTON2CL—This command is used to send a mouse button2click message to the system.

BUTTON1DBL—This command is used to send a mouse button1doubleclick message to the system.

BUTTON2DBL—This command is used to send a mouse button2doubleclick message to the system.

CTLDOWN—This command is used to simulate the pressing of the control key.

CTLUP—This command is used to simulate the releasing of the control key.

DELDOWN—This command is used to simulate the pressing of the delete key.

DELUP—This command is used to simulate the releasing of the delete key.

ALTDOWN—This command is used to simulate the pressing of the alt key.

ALTUP—This command is used to simulate the releasing of the alt key.

ENTER—This command is used to simulate the striking of the enter key.

TAB—This command is used to simulate the striking of the tab key.

MOVE "x,y"—This command causes the mouse pointer to move to the designated position.

TYPE "Text"—This command is used to demonstrate the typing of text into an entry field.

SLOWTYPE "Text"—This command is used to demonstrate the typing of text into an entry field slowly to simulate the appearance of an actual user's typing and give the user more time to absorb the information.

The script language includes additional commands to provide special functions as needed for by the information developer. These functions range from those to determine the given environment, to those involving the presentation of graphics and text for explanation purposes. These miscellaneous commands are as follows:

BIG "Text"—This command causes the specified text to show in the tutorial window in large type.

CLEARTEXT—This command clears the text in the active entry field.

DELAYn—This command causes the script to pause for the specified amount of time in hundredths of seconds. Thus setting to 100 is equivalent to a one second pause.

ENVIRONMENT X—The environment section of the script is used to declare variables relating to the various screen coordinates used in the script, as they will often vary from one environment to another. The variable x identifies the display monitor, which is preferably either the IBM 8513 or IBM 8514 Color Monitor.

END ENVIRONMENT—This command indicates the end of the environment declarations.

ENDTUTOR—This command signifies the end of the tutorial script.

FILL "Text"—This command is used to fill the tutorial window with the text that follows within quotations until an ENDFILL is processed.

ENDFILL—This command signifies the end of a tutorial text panel.

LOGO—This command causes the tutorial window to be filled with a LOGO bit map.

MANSTAND—This command creates the animated human figure standing in the tutorial window.

NEWLINE—This command is used within a FILL statement for spacing of the text.

PROMPT—This command will cause execution of the script to pause until the user clicks on the continue bar at the bottom of the tutorial window.

SECTION "text"—This command provides the information developer with a way to distinguish logical sections within a script, where n is a section number. The text provided will be placed on the continue bar at the bottom of the tutorial window when a PROMPT is encountered.

TRAV "text"—This command creates the animated figure in the tutorial window. The figure gives instructions to the user by reading text that scrolls through the caption bubble.

AUDIO "file name"—This command causes the system to fetch and produce audio tutorial information.

VIDEO "file name"—This command causes the system to fetch and display video tutorial or demonstration information to the user.

Figure 3:
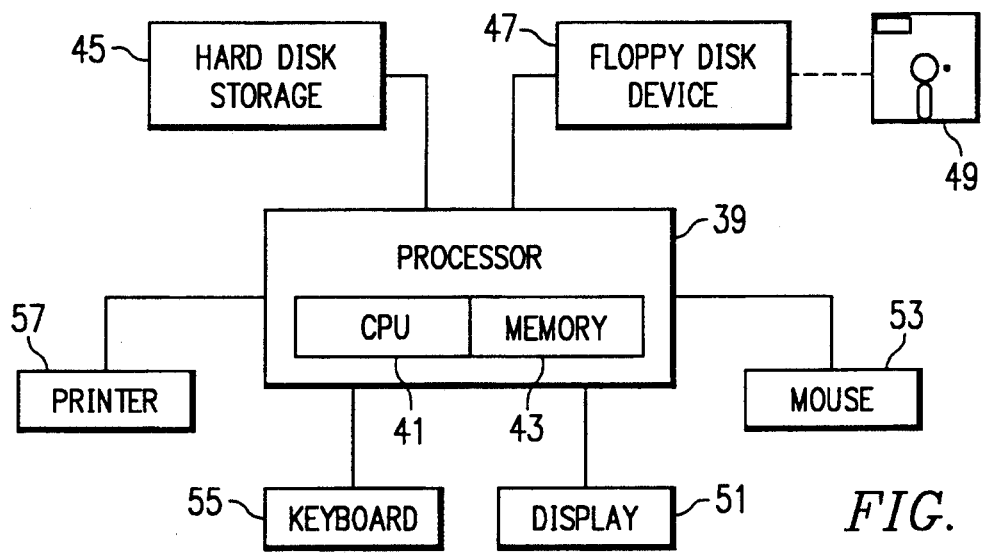
FIG. 3 is a block diagram of a computer system according to the present invention.

Referring now to FIG. 3, there is shown a block diagram of a system according to the present invention. This system includes a processor 39, which includes a central processing unit (CPU) 41 and random access memory 43. The system may also include additional memory in the form of a hard disk storage device 45, a floppy disk device 47, or preferably, both. Floppy disk device 47 is adapted to receive a diskette 49 that may have recorded thereon the software implementation of the present invention. The system of FIG. 3 includes user interface hardware, including a display 51, a mouse 53, and, a keyboard 55. The system may, optionally, include a printer 57.

Figure 4:
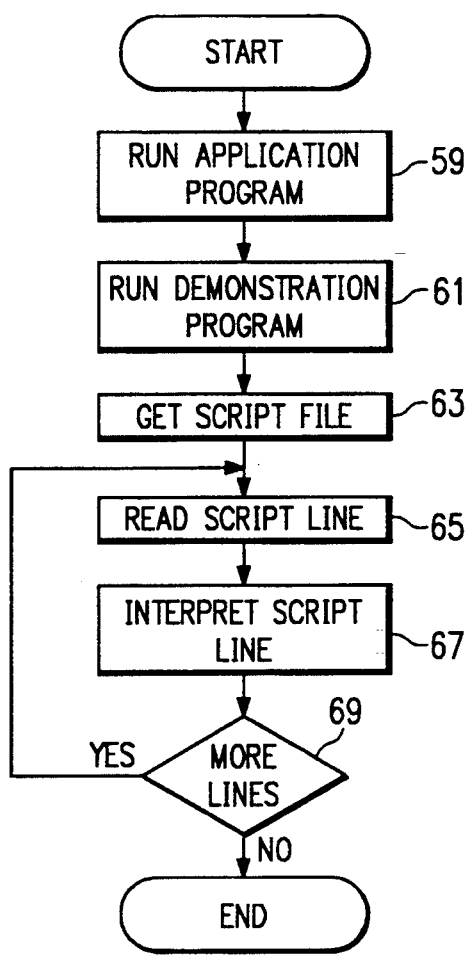
FIG. 4 is a flow chart of a preferred software implementation of the present invention.

Referring now to FIG. 4, there is shown a high level flow chart of a preferred software implementation of the present invention. Initially, the application programmed to be demonstrated is run block 59 and the demonstration program is run at block 61. In the preferred embodiment, the demonstration program includes an interpreter. After the demonstration program has started, the demonstration program gets the script file at block 63 and reads a script line at block 65. At block 67, the interpreter interprets the script line read at block 65. The interpretation step includes executing the script command or tag. After the script line has been interpreted at block 67, the system tests at decision block 69 whether there are more lines of the script. If there are, then the system returns to block 65 and reads the next line of the script. The system thus continues to loop through the script until there are no more lines, in which case at decision block 69, the demonstration ends.

From the foregoing, it may be seen that the present invention enables an information developer to build integrated tutorials with text and demonstrations quickly and easily. It uses a simple script language and is designed such that the technical writer that is authoring the tutorial can also create the demonstration of the application with only limited knowledge of computer programming. Moreover, it actually acts on the application to be demonstrated instead of creating a new program to simulate the application as in current systems. The system may include means for generating sound effects, such as button clicks and keyboard sounds in order to make the demonstration more interesting to the user. Also, those skilled in the art will recognize that the system may include recorded speech or text to speech generation for the textual portions of the tutorial, or other multi-media features.

The ease of use of the script language of the present invention allows tutorials to be developed late in the development cycle. When the application program to be demonstrated is substantially ready for release to the public, the information developer can create the demonstration while actually using the application program. The present invention provides a simple, editabler human readable script language for controlling the application. The demonstration program of the present invention is independent of the windowing system or programming language of the application program to be demonstrated. This allows ease of portability of tutorial to different windowing platforms.

While the invention has been particularly shown and described with reference to a preferred embodiment, it will be understood by those skilled in the art that various changes in form and detail may be made without departing from the spirit and scope of the invention.

What is claimed is:

1. A method of demonstrating a computer system application program, which comprises the computer system implemented steps of:
   running said application program;
   providing tutorial information to a user; and,
   sending simulated user-input messages to said application program thereby to demonstrate the operation of said application program.

2. The method as claimed in claim 1, wherein said step of providing tutorial information includes the steps of:
   displaying tutorial text on a computer system display screen.

3. The method as claimed in claim 2, wherein said tutorial text is displayed in a window.

4. The method as claimed in claim 1, wherein said application program includes a graphical user interface and said step of sending simulated user-input messages includes the computer implemented steps of:
   moving a graphical pointer to a preselected position on a computer system display screen; and
   sending a simulated mouse button command to said computer system.

5. The method as claimed in claim 1, wherein said application program includes a graphical user interface and said step of sending simulated user-input messages includes the computer implemented step of:
   activating a preselected object of said application program.

6. The method as claimed in claim 5, wherein said computer implemented steps further include the steps of:
   moving a graphical pointer to said preselected object; and
   sending a simulated mouse button command to said computer system.

7. The method as claimed in claim 1, wherein said step of sending simulated user-input messages includes the computer implemented step of:
   sending simulated keystroke commands to said application.

8. The method as claimed in claim 7, wherein said application program includes a graphical user interface and said step of sending simulated user-input messages includes the computer implemented step of:
   positioning a typing cursor in a text entry field of said application program.

9. The method as claimed in claim 1, wherein said step of providing tutorial information includes the steps of:
   displaying a representation of a human figure on a computer display screen;
   displaying a speech bubble near said human figure; and, displaying scrolling tutorial text in said speech bubble.

10. A method of demonstrating an application program in a multitasking computer system that includes a computer display screen and a user-input device, which comprises the computer implemented steps of:
    running said application program on said computer system;
    simultaneously running a demonstration program on said computer system; and,
    generating simulated user-input messages to said application program, under control of said demonstration program, thereby to simulate user interaction with said application program.

11. The method as claimed in claim 10, including the step of:
    providing tutorial information to a user, under control of said demonstration program.

12. The method as claimed in claim 11, wherein said step of providing tutorial information includes the step of:
    displaying tutorial text on said display screen.

13. The method as claimed in claim 10, wherein said step of generating user-input messages includes the steps performed by said demonstration program of:
    reading a line of a demonstration script;
    and interpreting said line.

14. The method as claimed in claim 13, including the computer implemented step of:
    providing to said user, under control of said demonstration program, tutorial information about another feature of said application program after demonstrating said feature of said application program.

15. A method of demonstrating an application program in a multitasking computer system that includes a computer display screen and a user input device, which comprises the computer implemented steps of:
   running said application program on said computer system;
   simultaneously running a demonstration program on said computer system;
   providing to a user, under control of said demonstration program, tutorial information about a feature of said application program;
   prompting said user for a demonstration of said feature; and,
   generating, in response to a user response to prompting, simulated user-input messages, under control of said demonstration program, thereby demonstrating said feature of said application program.

* * * * *